United States Patent
Godkin

(10) Patent No.: US 6,815,846 B2
(45) Date of Patent: Nov. 9, 2004

(54) LINEAR VOICE COIL ACTUATOR WITH A LATCHING FEATURE

(75) Inventor: Mikhail Godkin, San Diego, CA (US)

(73) Assignee: BEI Technologies, Inc., San Francisco, CA (US)

(*) Notice: Subject to any disclaimer, the term of this patent is extended or adjusted under 35 U.S.C. 154(b) by 0 days.

(21) Appl. No.: 10/241,316

(22) Filed: Sep. 10, 2002

(65) Prior Publication Data

US 2003/0052549 A1 Mar. 20, 2003

Related U.S. Application Data

(60) Provisional application No. 60/322,410, filed on Sep. 14, 2001.

(51) Int. Cl.⁷ ............................................... H02K 33/18
(52) U.S. Cl. ......................... 310/12; 381/400; 381/417; 381/418
(58) Field of Search ..................... 310/12, 21; 381/412, 381/421, 420, 422, 400, 417, 418

(56) References Cited

U.S. PATENT DOCUMENTS 4,363,980 A    12/1982  Petersen ..................... 310/15
6,269,168 B1 *  7/2001  Tagami ....................... 381/412

FOREIGN PATENT DOCUMENTS

| DE | 1 149 094 | 11/1956 | |
| JP | 61-104375 | 5/1986 | ........... G11B/21/02 |
| JP | 11-299211 | 10/1999 | ........... H02K/33/18 |

OTHER PUBLICATIONS

International Search Report dated Jul. 11, 2003.

* cited by examiner

Primary Examiner—Burton S. Mullins
Assistant Examiner—Iraj A. Mohandesi
(74) Attorney, Agent, or Firm—Gray Cary Ware & Freidenrich LLP

(57) ABSTRACT

Disclosed is a linear voice coil actuator having a latching feature, the actuator having a coil assembly, a field assembly, a magnetic structure positioned in the coil assembly, and a stop which limits the position of the magnetic structure with respect to the field assembly when the coil is not energized. The coil assembly has a coil base and a coil located in a cavity in the coil base. The field assembly preferably has an axially magnetized cylindrical magnet, a soft pole piece, and a soft magnetic housing. Preferably the magnetic structure is a magnetic plate positioned coaxially with the axis of magnetization of the magnet and having a diameter or a thickness which is selected to set a latching force between the plate and the magnet when the coil is not energized.

14 Claims, 4 Drawing Sheets

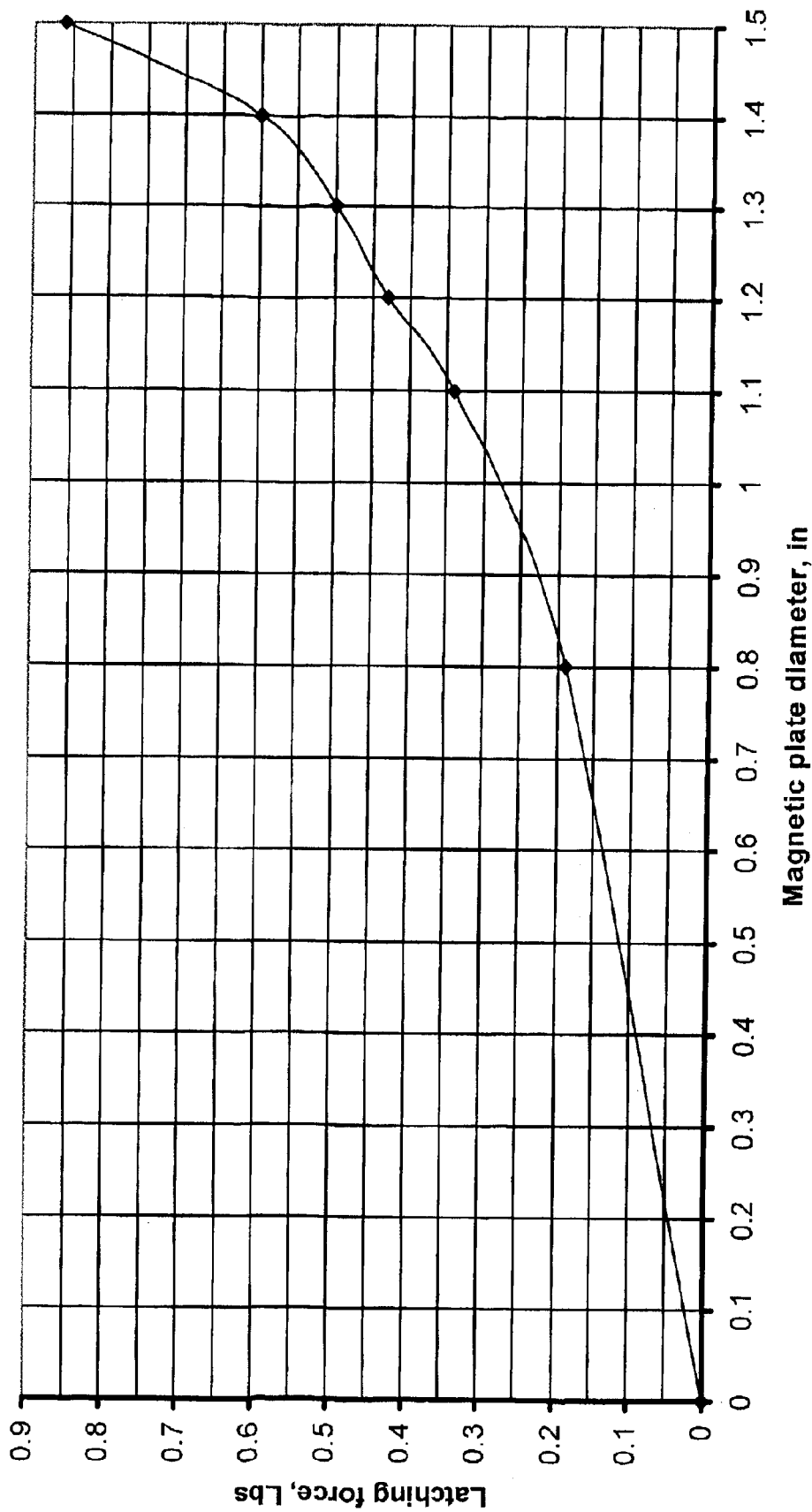
Fig. 4 Latching force vs. magnetic plate diameter

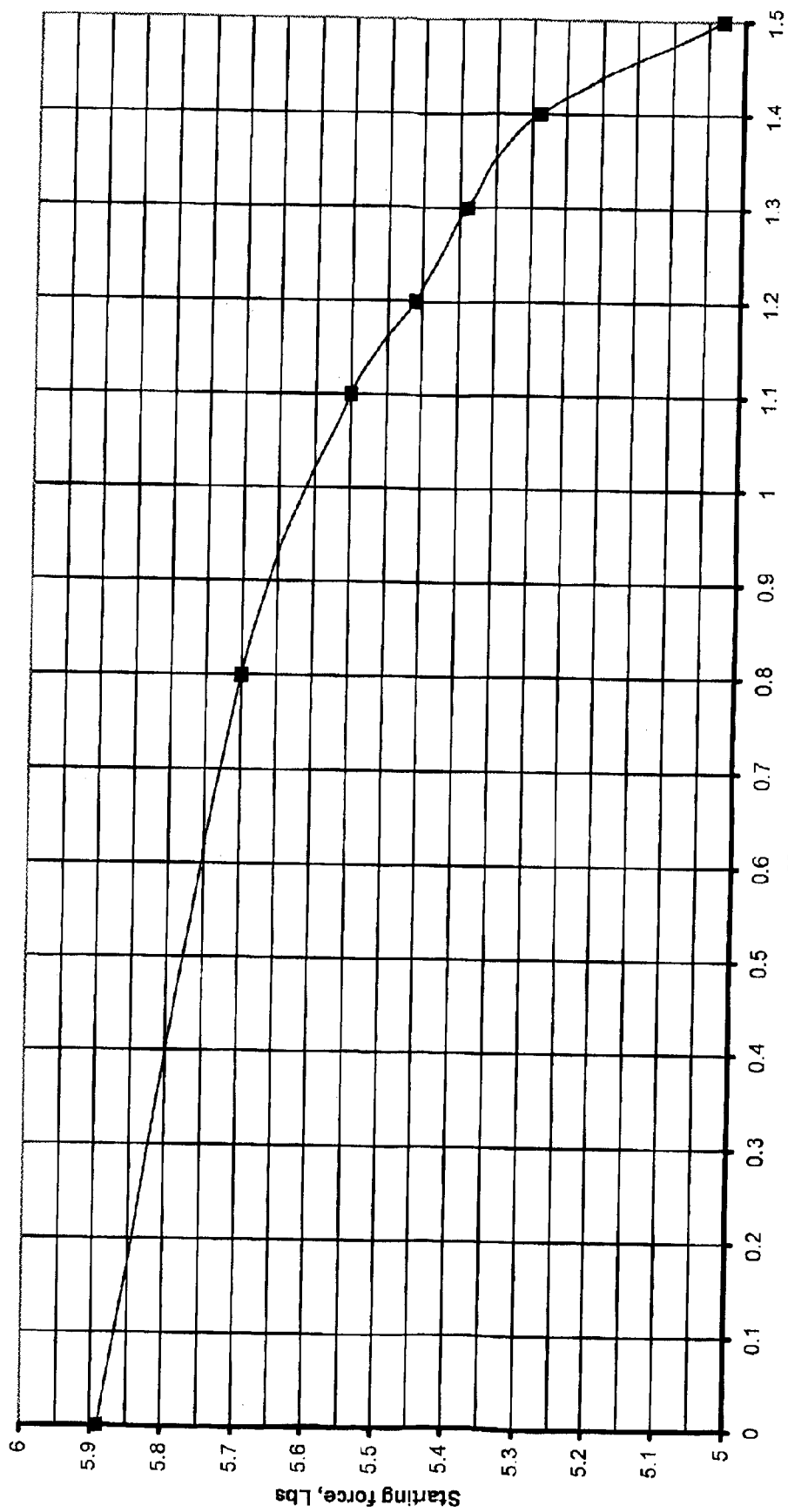
Fig. 5 Starting force vs. magnetic plate diameter

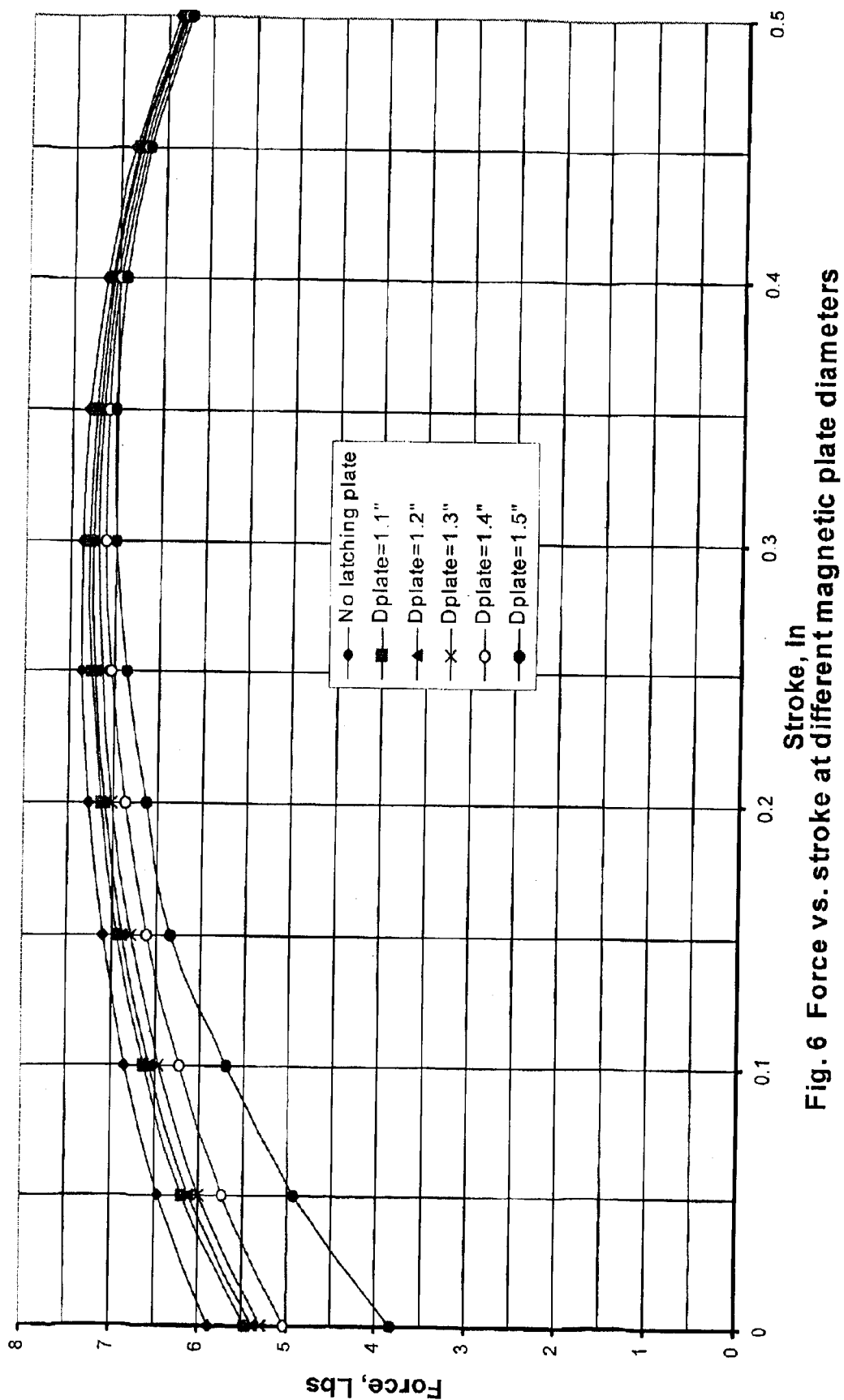
Fig. 6 Force vs. stroke at different magnetic plate diameters

LINEAR VOICE COIL ACTUATOR WITH A LATCHING FEATURE

RELATED APPLICATIONS

The present application claims priority under 35 U.S.C. §119(e) from provisional application No. 60/322,410, filed Sep. 14, 2001.

TECHNICAL FIELD

The present invention relates generally to linear actuators, and in particular to a linear voice coil actuator with a latching feature.

BACKGROUND ART

An example of a typical linear voice coil actuator is depicted in a one-half-cross section in FIG. 1, and consists of a field assembly 10 and a coil assembly 20. The field assembly 10 is comprised of an axially magnetized cylindrical magnet 12, soft magnetic pole piece 14 and soft magnetic housing 16. The coil assembly 20 consists of a coil 22, located in the circular cavity 23 of the coil base 24. The coil assembly 20, when de-energized, does not have a preferred position to go to. When such a position is required by the system operation, some kind of latching feature has to be provided.

SUMMARY OF THE INVENTION

The linear voice coil actuator of the subject application provides such a latching feature, and includes a coil assembly, a field assembly, and a magnetic structure positioned in the coil assembly. The coil assembly has a coil base and a coil located in a cavity in the coil base. The field assembly preferably has an axially magnetized cylindrical magnet, a soft magnetic pole piece, and a soft magnetic housing having sides which define a cavity. The coil of the coil assembly is positioned in a gap defined between interior surfaces of the sides of the magnetic housing and the soft magnetic pole piece and magnet. Preferably the magnetic structure is a magnetic plate positioned coaxially with the axis of magnetization of the magnet and having a diameter or a thickness that is selected to set a latching force between the plate and the magnet when the coil is not energized. Preferably a stop limits the position of the magnetic structure with respect to the field assembly when the coil of the coil assembly is not energized.

It is therefore an object of the present invention to provide a linear actuator having a latching feature.

It is another object of the present invention to provide a linear actuator in which a latching feature is provided by a magnetic structure positioned in the coil assembly of the actuator.

It is a further object of the present invention to provide a linear actuator in which a latching feature is provided by a magnetic plate positioned in a coil assembly wherein the thickness or diameter of the magnetic plate is selected to define a latching force between the coil assembly and a field assembly of the actuator when the coil assembly is not energized.

These and other features and advantages of the present invention will be more readily understood upon consideration of the following detailed description and accompanying drawings.

BRIEF DESCRIPTION OF THE DRAWINGS

FIG. 4 represents a latching force as a function of plate diameter curve for the actuator of FIG. 2 in a fully-in position.

FIG. 5 represents a starting force as a function of plate diameter curve for the actuator of FIG. 2 in a fully-in position.

FIG. 6 shows a family of the force vs. stroke characteristics of one embodiment of the actuator according to the invention.

DETAILED DESCRIPTION OF THE INVENTION

Figure 1:
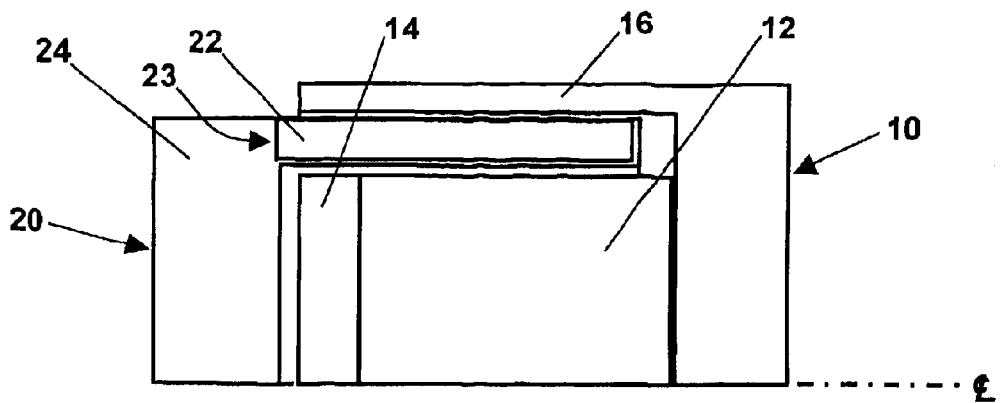
FIG. 1 illustrates a typical linear voice coil actuator depicted in a one-half-cross section.
Figure 2:
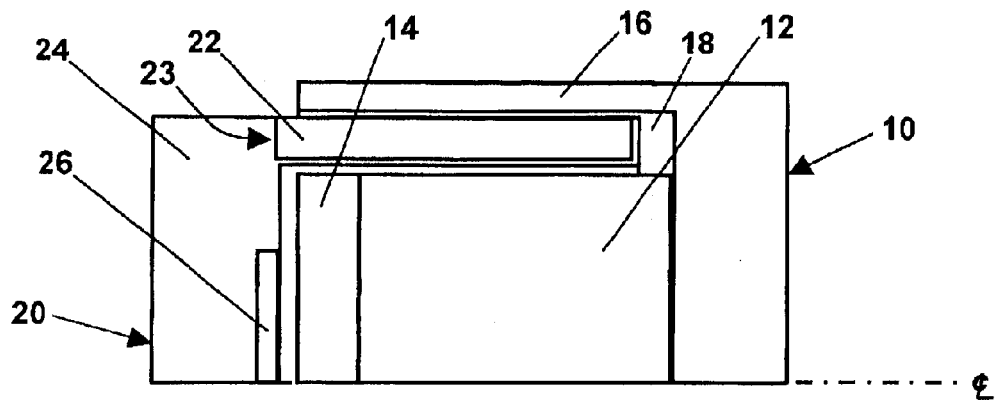
FIG. 2 illustrates a preferred embodiment of the present invention.

Referring now to FIG. 2, a preferred embodiment of the present invention is shown in a linear voice coil embodiment in a fully-in position with a coil assembly 20 that includes a magnetic structure, preferably a magnetic plate 26, attached to the coil base 24. (In FIG. 2, structures common to the actuator of FIG. 1 are indicated by like reference numerals.) Preferably magnetic plate 26 has a circular shape so that it can be defined by a diameter and thickness.

Because of the presence of magnetic plate 26 as shown in FIG. 2, the coil assembly 20 is attracted to the field assembly 10 and remains there as long as the coil 22 is not energized. The position of the coil 22 is determined by a stop (not shown) located between the coil and field assemblies 10 and 20, respectively.

In the embodiment of the present invention depicted in FIG. 2 the soft magnetic housing 16 of the field assembly 10 has sides that define a gap 18 between the interior surfaces of the sides of soft magnetic housing 16 and the soft magnetic pole piece 14 and magnet 12. As can be seen from FIG. 2, one end of magnet 12 is positioned on the soft magnetic housing 16, and the soft magnetic pole piece 14 is positioned on the opposite end of magnet 12. In the embodiment shown, the length of magnet 12 is several times the length of soft magnetic pole piece 14, and the length of coil 22 is approximately equal to the combined lengths of soft magnetic pole piece 14 and the stroke of the actuator.

In FIG. 2, coil 22 of the coil assembly 20 is shown positioned for movement in the gap 18 along the axis of magnetization of magnet 12. Preferably the magnetic plate 26 is positioned coaxially with the axis of magnetization of the magnet 12. In the fully-in position of the actuator shown in FIG. 2, it can be seen that the magnetic plate 26 is spaced apart from soft magnetic pole piece 14 by a small distance. In the embodiment of FIG. 2, this distance is set by the stop (not shown).

Figure 3:
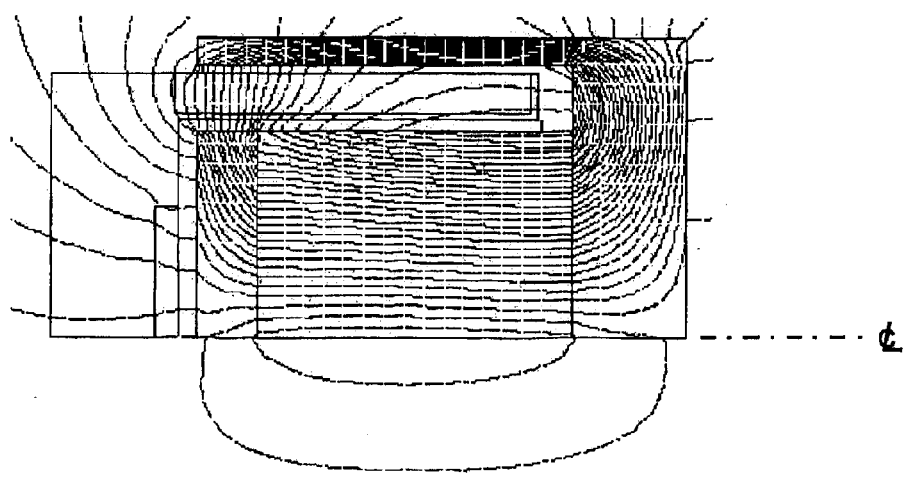
FIG. 3 illustrates the magnetic field of an actuator of FIG. 2 in a fully-in position.

The magnetic field of the actuator of FIG. 2, in a fully-in position, is depicted in FIG. 3. The latching force of this actuator for the given position and the thickness of the magnetic plate 26 (in this case, 0.050") is a function of the magnetic plate diameter. FIG. 4 represents a curve for a fully-in position of the actuator showing the relationship between the latching force and diameter of magnetic plate 26, assuming a plate thickness of 0.050". From the curve of FIG. 4 it can be seen that a desired amount of latching force can be selected by selecting the corresponding diameter for magnetic plate 26. For example, a latching force of 0.5 pounds can be obtained by selecting a plate diameter of 1.3". As another example, a plate diameter of 0.4" will provide a latching force of slightly less than 0.1 pound.

When coil 22 is energized, the coil assembly will move in a designated direction: away from the field assembly. For the initial (fully-in) position, the starting force of the actuator is also a function of the diameter of the soft magnetic plate 26, as illustrated in FIG. 5. One can consider this curve as the difference between the force produced by the actuator without the plate 26 (plate diameter is equal to zero) and the latching force of the actuator per FIG. 4. Thus, for example, for a 1.5" plate diameter, the starting force is approximately 5.03 pounds.

FIG. 6 shows a family of the force vs. stroke characteristics of one embodiment of the actuator according to the invention. Each curve corresponds to a certain geometry of the soft magnetic plate 26, including no latching plate at all, more specifically, for plate diameters of 0.0" (no plate), 1.1", 1.2", 1.3", 1.4" and 1.5". For example, for a plate diameter of 1.5", it can be seen that at the 0" stroke position the force of the actuator is approximately 3.8 pounds, compared with a force of approximately 5.9 pounds with no plate.

Three things should be noted:
1) all the curves depicted in FIG. 6 represent only one direction of motion—out of the field assembly;
2) the same latching effect can be obtained by using a fixed diameter for soft magnetic plate 26 and varying its thickness;
3) the latching feature can be employed in actuator configurations such as those described in U.S. Pat. No. 5,345,206, assigned to the assignee of the subject application, and incorporated herein by reference.

While the present invention has been described in the context of a cylindrically shaped actuator, it is to be understood that other shapes can be used within the spirit of the invention. Furthermore, the terms and expressions which have been employed herein are terms of description and not of limitation, and there is no intent in the use of such terms and expressions of excluding equivalents of the features shown and described, or portions thereof, it being recognized that various modifications are possible within the scope of the invention claimed.

What is claimed is:

1. A linear voice coil actuator comprising
   a field assembly including a magnet located inside the field assembly and having an axis of magnetization; and
   a coil assembly positioned for movement along the axis of magnetization of the magnet including
   a coil; and
   a magnetic structure positioned coaxially with the axis of magnetization of the magnet so that the coil assembly is attracted to a soft magnetic pole piece attached to the magnet inside the field assembly when the coil is not energized.

2. The actuator of claim 1 wherein the magnet is a cylindrical magnet.

3. The actuator of claim 1 wherein the field assembly includes
   an axially magnetized magnet;
   a soft magnetic housing having a cavity, wherein the magnet has first and second ends along the axis of magnetization of the magnet, and so that a first end of the magnet is positioned on the housing in the cavity, and further wherein the soft magnetic pole piece is positioned on a second end of the magnet.

4. The actuator of claim 3 wherein the magnet and pole piece are positioned in the cavity of the housing to define a gap between sides of the cavity and the magnet and pole piece; and further wherein the coil is positioned in the gap.

5. The actuator of claim 4 wherein the magnet, pole piece, cavity, and coil have cylindrical shapes.

6. The actuator of claim 1, 2, 3, 4, or 5, wherein the magnetic structure is a plate constructed of magnetic material.

7. The actuator of claim 6 further including a stop positioned to limit the position of the magnetic structure relative to the magnet when the coil is not energized.

8. The actuator of claim 7 wherein the plate has a disc shape.

9. The actuator of claim 8 wherein the plate has a diameter and a thickness at least one of which is selected to control a latching force between the plate and the magnet.

10. The actuator of claim 8 wherein the plate has a diameter and a thickness at least one of which is selected to control a latching force when the coil is in a predetermined position and the coil is not energized.

11. The actuator of claim 10 wherein the predetermined position is defined by the stop.

12. A linear voice coil actuator comprising
    a field assembly including
    an axially magnetized cylindrical magnet located inside the field assembly;
    a soft magnetic pole piece positioned on one end of the cylindrical magnet along the axis of magnetization of the cylindrical magnet;
    a soft magnetic housing having a circular cavity, wherein an end of the cylindrical magnet opposite the soft magnetic pole piece is positioned on the soft magnetic housing in the circular cavity to define a circular gap between the cylindrical magnet and the soft magnetic housing that is coaxial with the axis of magnetization of the cylindrical magnet;
    a coil assembly a least a portion of which is positioned in the circular gap for movement along the axis of magnetization of the magnet including
    a coil base having a circular cavity;
    a coil positioned in the circular cavity; and
    a magnetic plate having a diameter and a thickness and wherein the magnetic plate is attracted to a soft magnetic pole piece attached to the magnet inside the field assembly to latch the actuator with a latching force when the coil assembly is in a predetermined position in the circular gap and the coil is not energized; and
    a stop positioned to define the predetermined position of the coil assembly.

13. The linear actuator of claim 12 wherein the thickness of the magnetic plate is selected to set the latching force of the actuator.

14. The linear actuator of claim 12 wherein the diameter of the magnetic plate is selected to set the latching force of the actuator.

* * * * *